US012731774B2

(12) United States Patent
Ngo et al.

(10) Patent No.: US 12,731,774 B2
(45) Date of Patent: Sep. 8, 2026

(54) GUIDE ARRANGEMENT FOR A CAPILLARY HOLDER

(71) Applicant: Micromass UK Ltd, Wilmslow (GB)

(72) Inventors: Pham Hoang Vu Ngo, Singapore (SG); Arvind Rangan, Singapore (SG); Veronica Lum, Singapore (SG); Steven Rocha, Singapore (SG); Zhi Yin, Singapore (SG); Nicola Lumley, Wilmslow (GB); David Douce, Wilmslow (GB)

(73) Assignee: Micromass UK Ltd, Wilmslow (GB)

( * ) Notice: Subject to any disclaimer, the term of this patent is extended or adjusted under 35 U.S.C. 154(b) by 310 days.

(21) Appl. No.: 17/998,001

(22) PCT Filed: May 5, 2021

(86) PCT No.: PCT/GB2021/051076

§ 371 (c)(1),
(2) Date: Nov. 4, 2022

(87) PCT Pub. No.: WO2021/224610

PCT Pub. Date: Nov. 11, 2021

(65) Prior Publication Data

US 2023/0178352 A1 Jun. 8, 2023

(30) Foreign Application Priority Data

May 5, 2020 (SG) ............................ 10202004142S

(51) Int. Cl.
*H01J 49/04* (2006.01)

(52) U.S. Cl.
CPC ................................ *H01J 49/0404* (2013.01)

(58) Field of Classification Search
CPC .. H01J 49/0404; H01J 49/167; H01J 49/0431; H01J 49/0445; H01J 49/045; H01J 49/0454
USPC ..... 422/78–80, 507; 356/311–318, 440, 244, 356/246; 250/288, 440.11, 442.11, 443.1; 73/54.04–54.8, 864.02, 864.81, 864.91
See application file for complete search history.

(56) References Cited

U.S. PATENT DOCUMENTS

2012/0068063 A1* 3/2012 Fernandez ........... G01N 27/622
250/288
2019/0122878 A1* 4/2019 Holman ................ H01J 49/167
2019/0157061 A1* 5/2019 Datwani ............. H01J 49/0445

FOREIGN PATENT DOCUMENTS

| | | | | |
|---|---|---|---|---|
| CN | 104704374 | A | | 6/2015 |
| CN | 106683973 | A | * | 5/2017 |
| CN | 107643308 | A | | 1/2018 |
| EP | 1293783 | A2 | | 3/2003 |

(Continued)

OTHER PUBLICATIONS

Combined Search and Examination Report for GB Patent Application No. GB2020719.7, mailed Apr. 29, 2021.

(Continued)

*Primary Examiner* — Robert R Raevis
(74) *Attorney, Agent, or Firm* — Goodwin Procter LLP

(57) ABSTRACT

A guide arrangement for a capillary holder A guide arrangement for a capillary holder of the type having a housing and a capillary protruding from the housing, the guide arrangement comprising: a bracket; and a carriage translatably arranged with respect to the bracket, the carriage having a bed to receive the housing of the capillary holder.

18 Claims, 7 Drawing Sheets

(56) References Cited

FOREIGN PATENT DOCUMENTS

| | | | | |
|---|---|---|---|---|
| WO | 2004037157 A2 | 5/2004 | | |
| WO | 2010100507 A1 | 9/2010 | | |
| WO | WO-2017208030 A1 * | 12/2017 | ............ | G01N 1/405 |

OTHER PUBLICATIONS

International Search Report and Written Opinion for International Patent Application No. PCT/GB2021/051076, mailed Aug. 3, 2021.

Waters Corp, "Waters Gives More Laboratories Access to Mass Spectrometry with Rapid, Easy, and Compact Radian Asap System", waters.com, https :/ /ir. waters. com/newsroom/press-release-details/2020/Waters-Gives-More-Laboratories-Access-to-Mass-Spectrometry-with-Rapid-Easy-and-Compact-RADIAN-ASAP-System/default.aspx, Nov. 2, 2020.

Waters Corp, "Radian Asap—Sample Introduction", waters.com, https://videos. waters. com/ detail/video/6213091640001/radian-asap---sample-introduction, Dec. 7, 2020.

MindMachine, "Printer Faults—Misfeed in Cassette", mindmachine.co.uk, https://mindmachine.co.uk/products/01_Printer_Gen_Faults_ Misfeed_In_Cassette.html, [accessed Apr. 22, 2021].

Berman, M.S., et al., "Development and Characterization of a Novel Plug and Play Liquid Chromatography—Mass Spectrometry (LC-MS) Source That Automates Connections between the Capillary Trap, Column, and Emitter", Molecular & Cellular Proteomics, 12(6):1701-1708, Jun. 1, 2013.

* cited by examiner

GUIDE ARRANGEMENT FOR A CAPILLARY HOLDER

CROSS-REFERENCE TO RELATED APPLICATIONS

This application is a U.S. national phase filing claiming the benefit of and priority to International Patent Application No. PCT/GB2021/051076, filed May 5, 2021, which claims priority from and the benefit of Singapore patent application Ser. No. 10/202,004142S, filed May 5, 2020. The entire contents of these applications are incorporated herein by reference.

DESCRIPTION OF INVENTION

The present invention relates to a holder for a capillary and a method of using the same.

BACKGROUND OF THE INVENTION

The invention generally relates to an atmospheric solids analysis probe (ASAP). Such probes, and the associated instrument for use with ASAP, are provided by several manufacturers, including Waters Corporation, Milford, MA, U.S.A.

ASAP is a useful and relatively cheap tool for use in the direct analysis of volatile and semi-volatile, solid and liquid samples and may be used in the analysis of specialty chemicals, synthetic polymers, energy sources and food.

A sample is introduced into an ion source housing (e.g. an API source), in which the sample is volatilised using a heated gas, such as nitrogen, and the sample is then ionised using, for example, a corona discharge pin. The ionised sample may subsequently be analysed in a mass spectrometer.

The sample is introduced into the source by loading it onto the tip of a capillary. The capillary may comprise a conventional glass capillary.

Capillaries are fragile and susceptible to contamination. To ensure reliable and accurate analysis, the tip of the capillary must be inserted into the source in a repeatable manner.

To assist in the loading of a capillary into a source, it is known to provide a holder comprising a clamp mechanism which serves to retain the proximal end of the capillary (opposite the tip at the distal end which carries a sample) in the capillary holder. This may provide a user with a more robust method of handling the capillary, and may also assist in the guiding of the capillary into the source.

The present invention seeks to provide a guide arrangement for a capillary holder, mountable to the housing of a source assembly.

Accordingly, the present invention provides a guide arrangement for a capillary holder of the type having a housing and a capillary protruding from the housing, the guide arrangement comprising: a bracket; and a carriage translatably arranged with respect to the bracket, the carriage having a bed to receive the housing of the capillary holder.

In at least one embodiment, the bed is movable with respect to the carriage.

In at least one embodiment, the bed is movable with respect to the carriage between: a first position, for receiving the housing of the capillary holder onto the bed; and a second position in which the capillary holder and carriage are translatable with respect to the bracket.

In at least one embodiment, the guide arrangement is configured such that when the bed is in the first position relative to the carriage, translation of the carriage with respect to the bracket is substantially prevented.

In at least one embodiment, the bed is biased towards the first position.

In at least one embodiment, the carriage comprises one of a pair of magnetically attractive members, for co-operation with the other of a pair of magnetically attractive members on the housing of the capillary holder, to retain the capillary holder on the bed in use.

In at least one embodiment, the guide arrangement is configured such that, in the first position, the bed is arranged at an angle to the direction of translation of the carriage, and in the second position, the bed is arranged to be substantially parallel to the direction of translation of the carriage.

In at least one embodiment, the bracket or carriage comprises at least one rail and the other of the bracket or carriage is slidably mounted to the at least one rail.

In at least one embodiment, the carriage has a capillary support channel, for receiving a capillary projecting from the housing of a capillary holder receivable on the bed in use.

In at least one embodiment, the carriage comprises a plinth arranged adjacent the bed, the plinth defining the capillary support channel.

In at least one embodiment, the bracket comprises opposing side walls and a base, defining an enclosure therebetween for receiving the carriage, and the carriage comprises an end wall configured to engage the side walls of the bracket when the carriage is translated with respect to the bracket.

The present invention further provides an assembly for attachment to a housing of a source assembly, the housing having a port for receiving a capillary into the source assembly in use, the assembly comprising: a guide arrangement as disclosed, wherein the bracket is mountable to the housing of the source assembly; and a shutter arrangeable adjacent the port, movable between an open position, to substantially expose the port, and a closed position, to substantially cover the port.

In at least one embodiment, the guide arrangement is configured to open the shutter as the carriage is translated with respect to the bracket, towards the housing of the source assembly.

In at least one embodiment, the guide arrangement is configured to open the shutter as the carriage is translated with respect to the bracket, towards the housing of the source assembly, only if a capillary holder is received on the bed of the carriage.

In at least one embodiment, the guide arrangement further comprises at least one lever, a first end of the lever being rotatably mounted to the bracket and the second end engagable with the shutter, and wherein the bed of the carriage comprises a cam member configured to engage with the lever as the carriage is translated with respect to the bracket, towards the housing of the source assembly, to open the shutter.

In at least one embodiment, the guide arrangement or assembly further comprises a capillary holder having a housing and a capillary protruding from the housing, the capillary holder received on the bed of the carriage.

The present invention further provides a method of loading a capillary into a source assembly, the capillary retained in the housing of a capillary holder and protruding therefrom, the method comprising: providing a guide arrangement comprising: a bracket; and a carriage translatably arranged with respect to the bracket, the carriage having a bed to receive the housing of the capillary holder; mounting the bracket on the housing of the source assembly; arranging the capillary holder on the bed of the carriage; translating the carriage with respect to the bracket towards the source assembly, such that the distal end of the capillary is received in the source assembly.

The present invention further provides the bed is movable with respect to the carriage between: a first position, for receiving the housing of the capillary holder onto the bed; and a second position in which the capillary holder and carriage are translatable with respect to the bracket, wherein the bed is arranged in the first position when arranging the capillary holder on the bed of the carriage, the method comprising moving the bed into the second position before the step of translating the carriage with respect to the bracket.

SUMMARY OF THE FIGURES

Embodiments of the present invention will now be described, by way of non-limiting example only, with reference to the following figures in which.

DETAILED DESCRIPTION OF EMBODIMENTS

Figure 3:
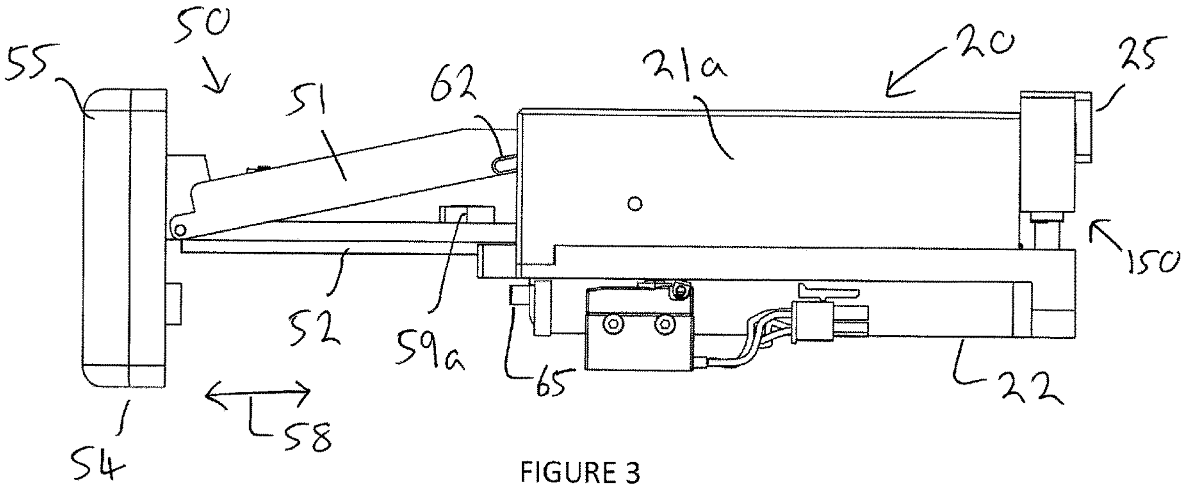
FIG. 3 shows a side view of the guide arrangement of FIGS. 1 and 2.
Figure 4:
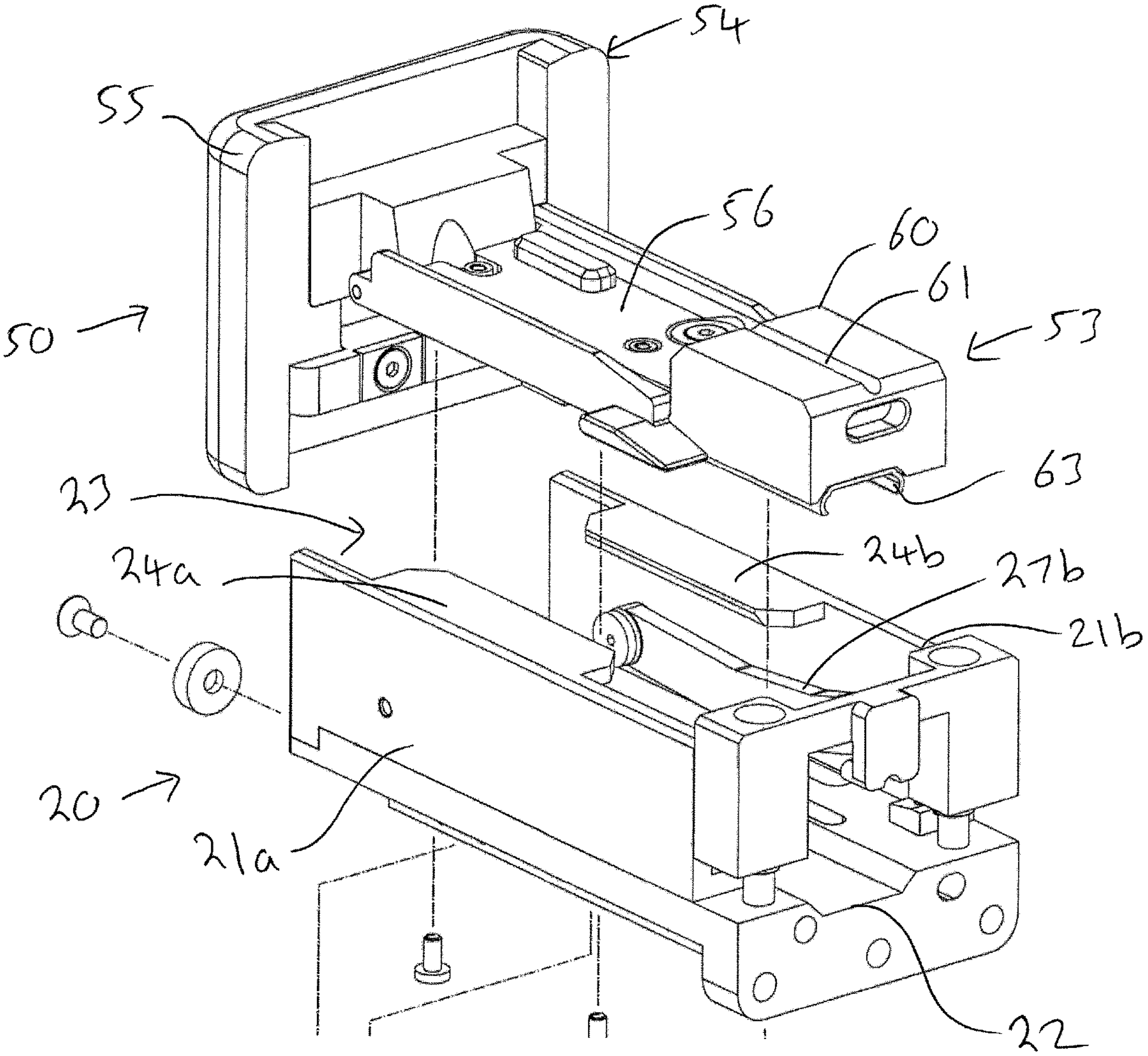
FIG. 4 shows an exploded view of a guide arrangement of FIGS. 1 to 3 shown in a loaded configuration.
Figure 5:
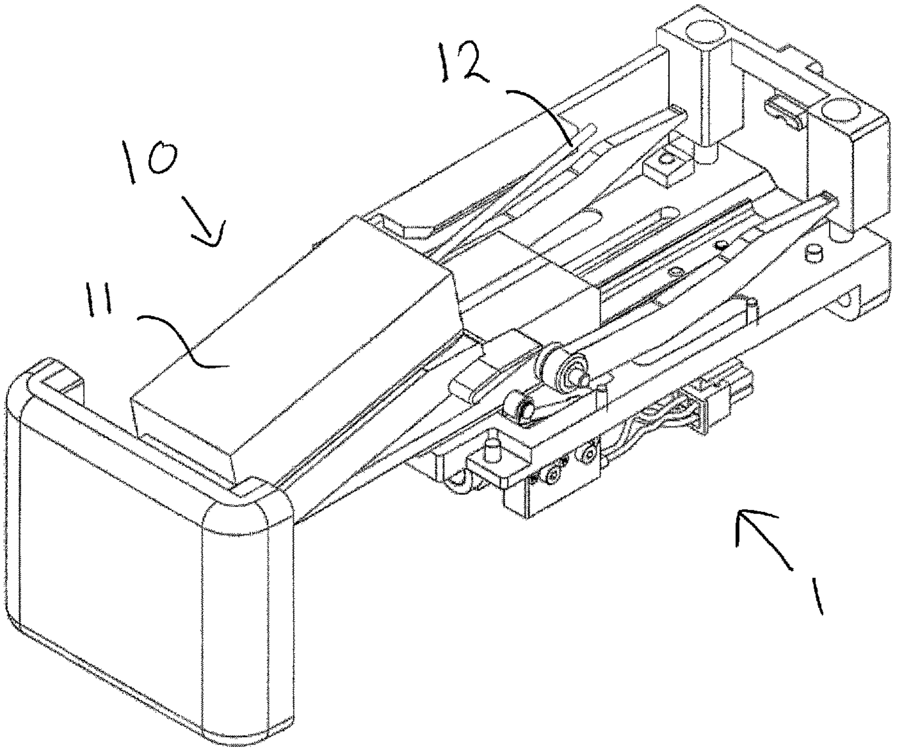
FIG. 5 shows a view of the guide arrangement of FIG. 1, with a capillary holder loaded on the bed.

FIGS. 1 to 9 illustrate a guide arrangement 1 embodying the present invention. The guide arrangement 1 is for use with a capillary holder 10 of the type having a housing 11 and a capillary 12 protruding from the housing 11, as shown in FIG. 5. In the embodiment shown, the capillary holder 10 has a substantially cuboid housing 11. The housing 11 of the capillary holder 10 may take other forms, and its shape is not of relevance to the present invention.

The housing 11 comprises a port (not shown) on an end face and defines a passage therein to retain at least the proximal end of a capillary 12. The capillary 12 may be received in the housing 11 of the capillary holder 10 such that at least a part of the capillary 12 protrudes from the housing 11. The capillary 12 may protrude perpendicularly from the end face of the housing 11 of the capillary holder 10.

The guide arrangement 1 comprises a bracket 20 and a carriage 50 translatably arranged with respect to the bracket 20. The carriage 50 further has a bed 51 to receive the housing 11 of the capillary holder 10 in use.

Figure 1:
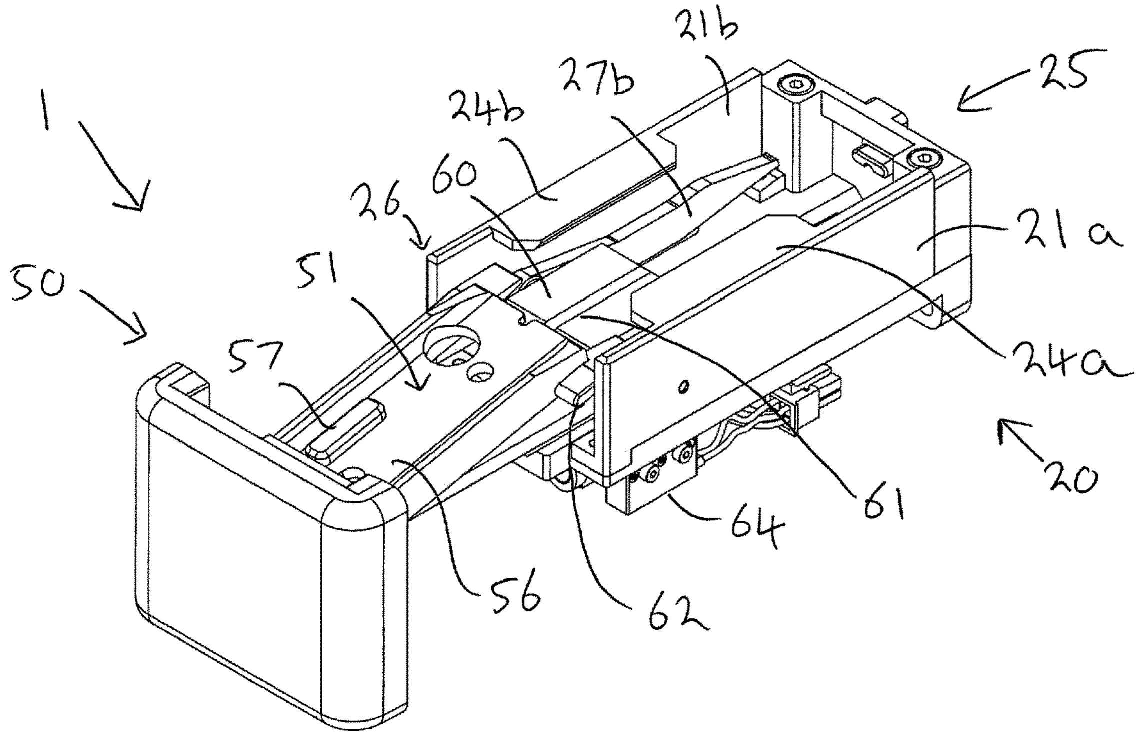
FIG. 1 illustrates a guide arrangement embodying the present invention, in a loading configuration.
Figure 2:
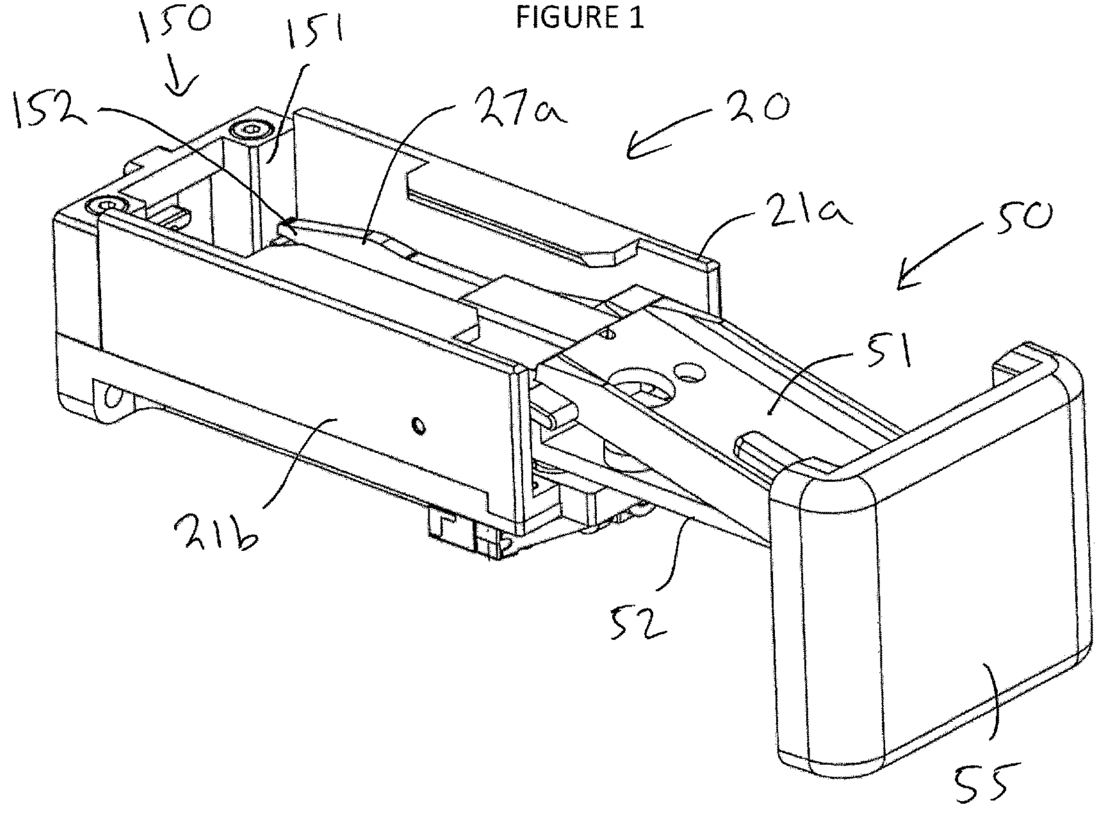
FIG. 2 shows the guide arrangement of FIG. 1, from a different angle.
Figure 6:
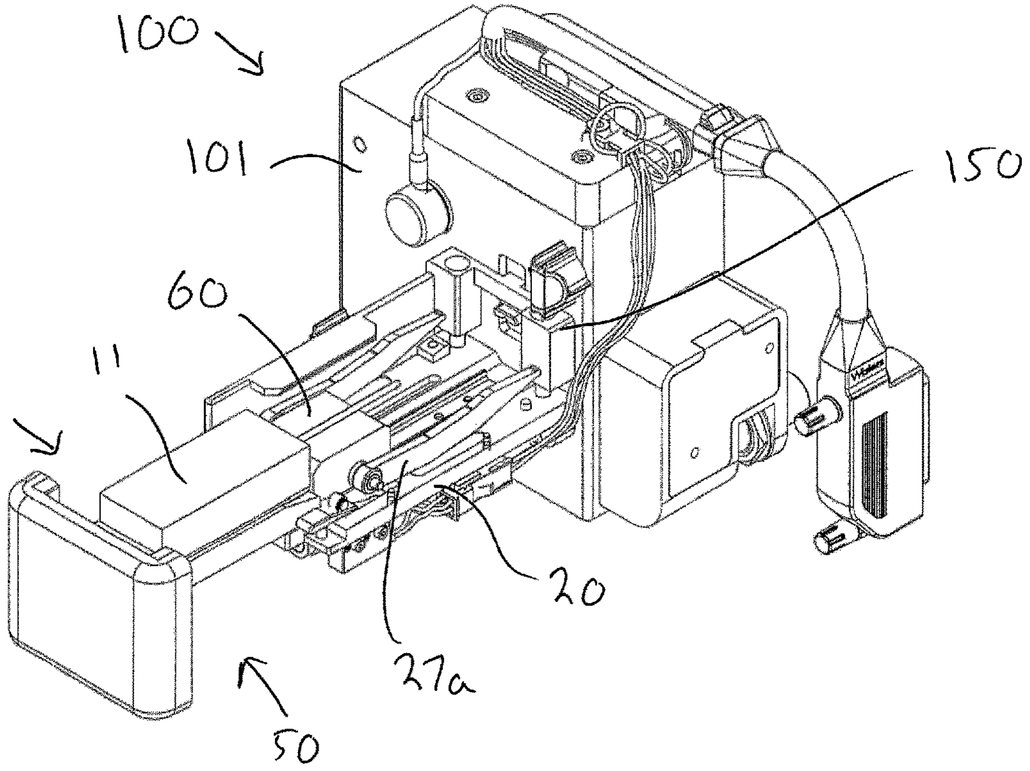
FIG. 6 shows a partial view of a guide arrangement (with one side wall removed) embodying the present invention, during the insertion of the capillary holder into a source assembly.
Figure 7:
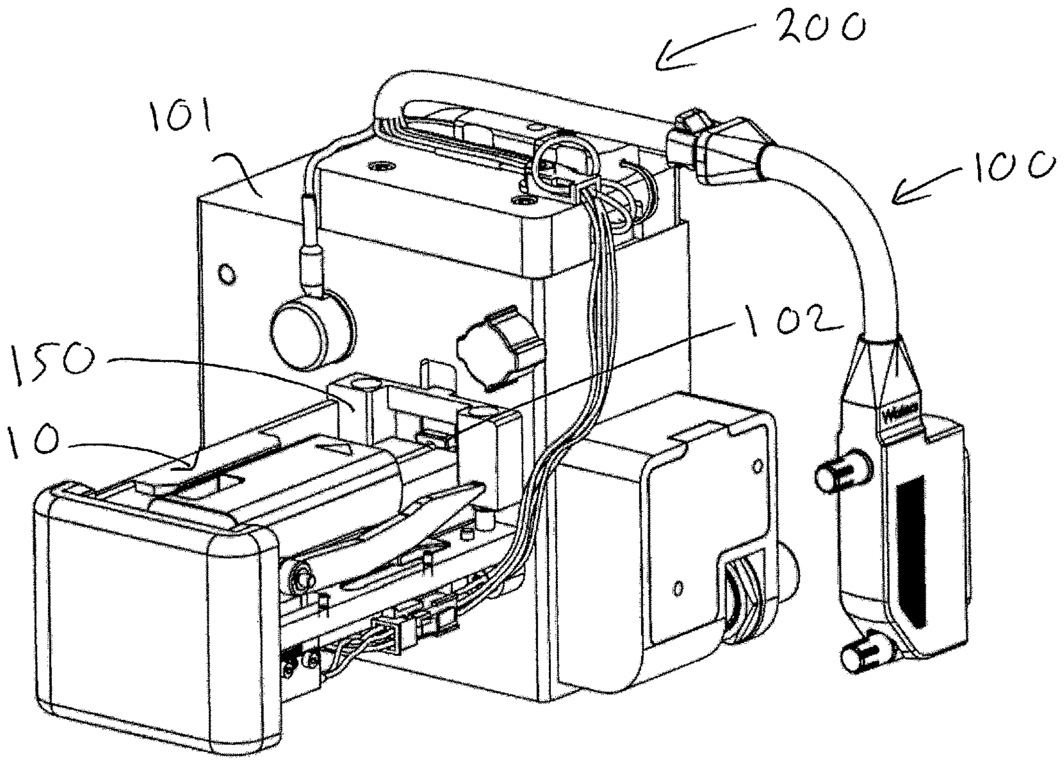
FIG. 7 shows a partial view of a guide arrangement embodying the present invention, in which a capillary holder is loaded into the bed and the carriage is translated towards the housing of the source assembly.

In the embodiment shown, the bracket 20 comprises first 21*a* and second 21*b* opposing side walls and a base 22 joined between the side walls 21*a*, 21*b*. The side walls 21*a*, 21*b* and the base 22 together define an enclosure 23. The enclosure 23 receives at least a part of the carriage 50. In the embodiment shown, each of the side walls 21*a*, 21*b* of the bracket 20 is provided with a plate 24*a*, 24*b* protruding perpendicularly inwardly from the top of each of the side walls 21*a*, 21*b*. A first end 25 of the bracket 20 is mountable to the housing 101 of a source assembly 100, as shown in FIGS. 6 and 7. The other, second 26, end of the bracket 20 may be open, as shown in FIG. 1, so as to translatably receive the first end 53 of the carriage 50 in the enclosure 23. The first end 25 of the bracket 20 may be removably secured to the housing 101 of the source assembly 100 by conventional means. As shown in FIG. 4, the first end 25 of the base 22 of the bracket 20 may comprise a plurality of apertures through which screws may be received to secure the base 22, and thus the bracket 20, to the housing 101 of the source assembly 100.

Although the side walls 21*a*, 21*b* and base 22 of the embodiment illustrated are substantially solid, this is not essential. The base 22 may be comprised of a heat resistant/insulating material, such as PEEK or Vespel. This may have the benefit that the base is less likely to become hot in use, which a user may otherwise inadvertently touch after a data acquisition when the carriage 50 is translated away from the bracket 20.

Figure 8:
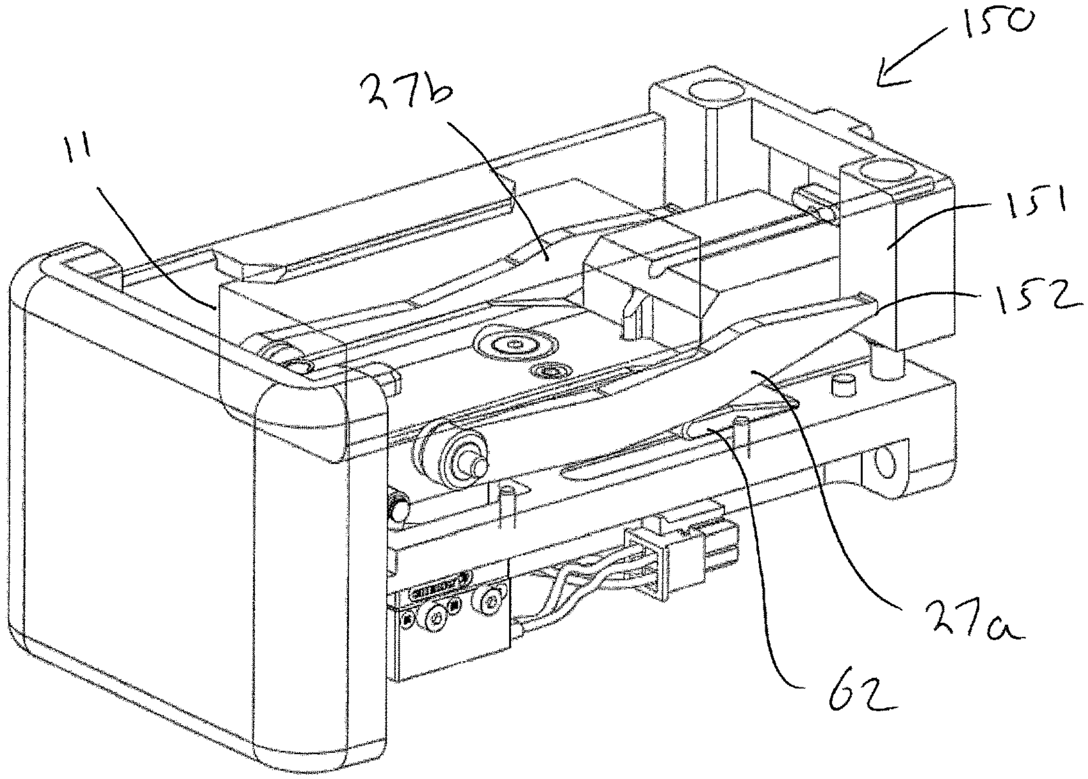
FIG. 8 is an enlarged view of the arrangement shown in FIG. 7, with the capillary holder shown in ghost lines to aid clarity.
Figure 9:
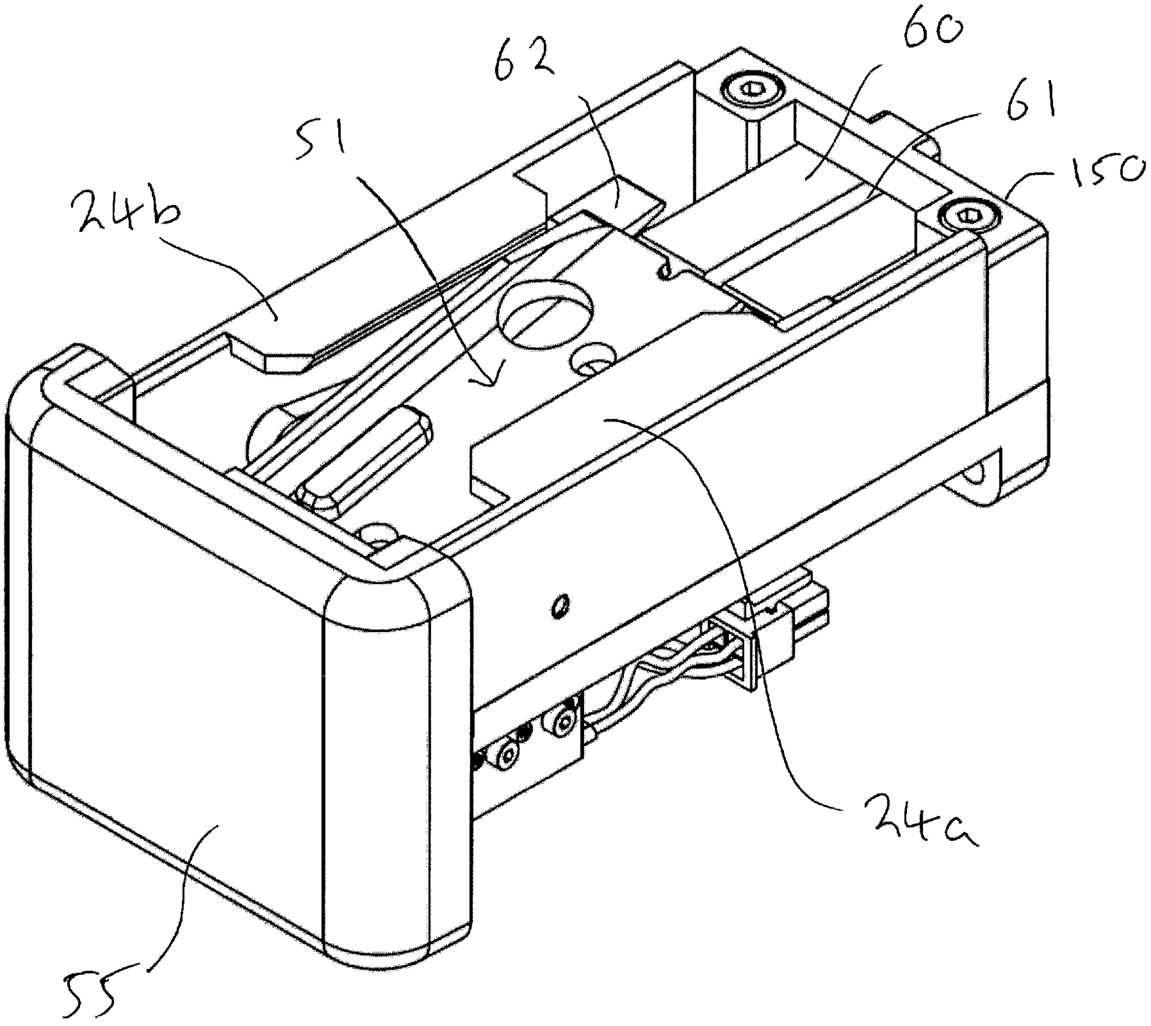
FIG. 9 illustrates a configuration of a guide arrangement embodying the present invention when a capillary holder is not loaded onto the bed.

As best shown in FIG. 3, the carriage 50 may comprise a chassis 52. The carriage 50 further comprises a bed 51 which is movable with respect to the carriage 50. In the embodiment shown, the bed 51 is mounted to the chassis 52 such that it is movable with respect to the chassis 52. The carriage 50 includes a first end 53 receivable in the bracket, and a second end 54 opposite the first end 53. In at least one embodiment, the bed 51 is pivotably mounted with respect to a part of the chassis 52 adjacent to the second end 54 of the carriage 50. The carriage 50 may further comprise an end wall 55 configured to engage with the side walls 21*a*, 21*b* of the bracket 20 when the carriage 50 is translated towards the bracket 20. This is shown in FIGS. 7 to 9. Effectively, the end wall 55 of the carriage 50 serves to enclose the enclosure 23 formed by the side walls 21*a*, 21*b* and the base 22 of the bracket 20.

The face of the end wall 55 is arranged substantially perpendicular to the direction 58 of translation of the carriage 50 with respect to the bracket 20. The end wall 55 may be provided with features to aid manual handling of the end wall 55. Such features may include burring, a finger hold(s) and/or a handle(s). Such features may assist a user in gripping the carriage 50 when needing to translate the carriage 50 away from the bracket 20, in use.

The bed 51 is movable with respect to the carriage 50 between a first position, for receiving the housing 11 of the capillary holder 10 onto the bed 51; and a second position in which the capillary holder 10 and carriage 50 are translatable with respect to the bracket 20. FIGS. 1 to 3 and 5 illustrate the bed 51 in the first position and FIGS. 6 to 8 illustrate the bed 51 in the second position.

In at least one embodiment, the bed 51 is configured such that it presents a surface 56 which is formed to substantially correspond to the form of the housing 11 of the capillary holder 10 receivable thereon. In at least one embodiment, the bed 51 may comprise a tray sized to receive the housing 11 of the capillary holder 10 and to substantially prevent movement of the capillary holder 10 in the plane of the bed 51. The bed 51 may comprise a depression to receive the housing 11 of the capillary holder 10. In at least one embodiment, one of the housing 11 of the capillary holder 10 and the bed 51 may comprise a protrusion 57 which is receivable in a corresponding recess (not shown) on the other of the housing 11 of the capillary holder 10 and the bed 51, to substantially prevent movement of the capillary holder 10 in the plane of the bed 51 when loaded onto the bed 51.

In at least one embodiment, the bed 51 is biased towards the first position. With reference to the embodiment shown in FIG. 3, there may be a spring member (not shown) provided to bias the bed 51 towards the first position. For example, a spring (such as a compression spring) may be associated with the pin which attaches the bed 51 to the chassis 52, which torsion spring urges the bed 51 in an anti-clockwise manner in the configuration shown in FIG. 3.

A guide arrangement 1 embodying the present invention is configured to receive the housing 11 of a capillary holder 10 on the bed 51 when the bed 51 is in the first position, as illustrated in FIG. 5. The biasing of the bed 51 towards the first position may be such that the weight of the capillary holder 10 when in place overcomes the spring force, so that the placement of the capillary holder 10 on the bed 51 causes the bed 51 to move from the first position into the second position, in which the bed 51 is arranged substantially coplanar with the chassis 52, as shown in FIG. 6. Consequently, when the bed 51 is in the first position, it is arranged at an angle to the direction 58 of translation of the carriage 50 with respect to the bracket 20, and in the second position, the bed 51 is arranged to be substantially parallel to the direction 58 of translation of the carriage 50 with respect to the bracket 20.

In at least one embodiment, the carriage 50 comprises one of a pair of magnetically attractive members 59*a*, 59*b*. The housing 11 of the capillary holder 10 may comprise the other 59*a*, 59*b* of the pair of magnetically attractive members, which together cooperate to retain the capillary holder 10 on the bed 51 in use. Furthermore, the extent of magnetic attraction may be such that the bed 51, when the capillary holder 10 is mounted thereon, is held under the magnetic force in the second position, as shown in FIGS. 6 and 7.

The bed 51 may be configured such that a capillary holder 10 is only correctly receivable on the bed 51 if the capillary holder 10 is loaded with a capillary 12. If the capillary holder 10 does not contain a capillary 12, it may not be correctly received on the bed 51 and translation of the carriage 50 with respect to the bracket 20 may be substantially prevented.

The shape of the capillary holder 10 may change depending on whether a capillary 12 is retained therein. The bed 51 may be shaped to correspond to the shape of the capillary holder 10 when loaded with a capillary 12. Alternatively, there may be a feature on the capillary holder 10 which protrudes from the side wall of the capillary holder 10 when a capillary 12 is not loaded. The protrusion may prevent the capillary holder 10 from being correctly seated on the bed 51 in use. The opposite arrangement is possible.

In another arrangement, the capillary holder 10 may comprise a button which translates with respect to the capillary holder 10, and which is connected to a retention mechanism. The position of the button relative to the housing of the capillary holder 10 may denote whether or not a capillary 12 is received in the capillary holder 10. The bed 51 may be provided with a projection which contacts the button of an unloaded capillary holder 10, preventing correct seating, but which does not contact the button of a correctly loaded capillary holder 10, allowing for the correct seating of the capillary holder 10 on the bed 51.

The bed 51 may be configured so as only to receive the capillary holder 10 in a single orientation of the capillary holder 10.

An advantage of the above noted functionality is to provide substantially 'fool proof' operation, preventing the translation of the carriage 50 with respect to the bracket 20 unless the capillary holder 10 is loaded with a capillary 12.

A benefit of the bed 51 being movable between a first and second position may be illustrated with reference to FIGS. 3 and 5.

As noted above, the capillary holder 10 has a capillary 12 protruding therefrom. The capillaries 22 are delicate and may break easily. Moreover, the capillary 12 may be contaminated if it comes into contact with anything other than the sample.

A guide arrangement 1 embodying the present invention allows the safe and repeatable insertion of the capillary 12 into a source assembly 100. A guide arrangement 1 embodying the present invention serves to assist in the alignment and subsequent insertion of the capillary 12 into the housing 101 of the source assembly 100. All a user needs to do is to arrange the housing 11 of the capillary holder 10 onto the bed 51 of the guide arrangement 1, and then the mechanism of the guide arrangement 1 serves to ensure the correct alignment and subsequent loading of the capillary 12 into the housing 101 of the source assembly 100.

As shown in FIG. 5, when the capillary holder 10 is loaded onto the bed 51 arranged at the first position, angled with respect to the chassis 52, the housing 11 of the capillary holder 10 and the capillary 12 protruding therefrom are angled upwardly. A user may transfer a sample to the capillary 12 when in this state, for example by using a pipette to transfer sample to the distal end of the capillary 12. This is not essential. A sample may have been transferred to the capillary 12 remote from the assembly, before loading the capillary holder 10 into the bed 51. Sample may be transferred to the capillary 12 by dipping.

Subsequently, when the bed 51 is rotated into the second position, the capillary 12 is then arranged substantially coaxially with the direction 58 of translation of the carriage 50 with respect to the bracket 20. The arrangement of the capillary 12 is then coaxial with the port 102 of the housing 101 of the source assembly 100.

In at least one embodiment, the carriage 50 further comprises a capillary support channel 61, for receiving the capillary 12 projecting from the housing 11 of the capillary holder 10. In the embodiment shown, the carriage 50 comprises a plinth 60 mounted to the chassis 52, and the plinth 60 comprises the capillary support channel 61. The plinth 60 is arranged adjacent the bed 51. When a capillary holder 10 is loaded onto the bed 51 and the bed 51 is arranged in the second position, the plinth 60 is arranged substantially adjacent to the end face of the housing 11 of the capillary holder 10. The capillary support channel 61 is arranged to coaxially align with the capillary 12 protruding from the capillary holder 10.

In at least one embodiment, the bracket 20 may comprise at least one rail and the carriage 50 is slidably mounted to the at least one rail. Alternatively, the carriage 50 may comprise a rail and the bracket 20 may be slidably mounted to the rail of the carriage 50. In the embodiment shown in FIG. 4, the underside of the chassis 52 of the carriage 50 comprises a rail follower 63 which is mountable to a rail (not shown) on the bracket 20.

Figure 10:
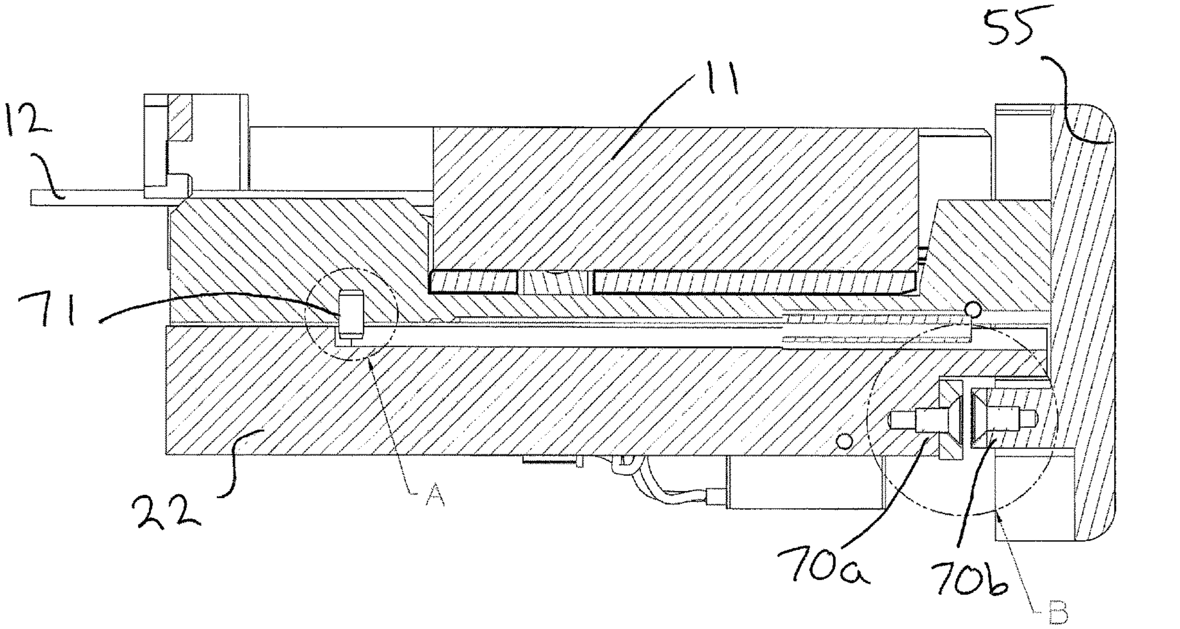
FIGS. 10, 10*a* and 10*b* illustrate an end stop and magnetic members of a guide arrangement embodying the present invention.
Figure 10A:
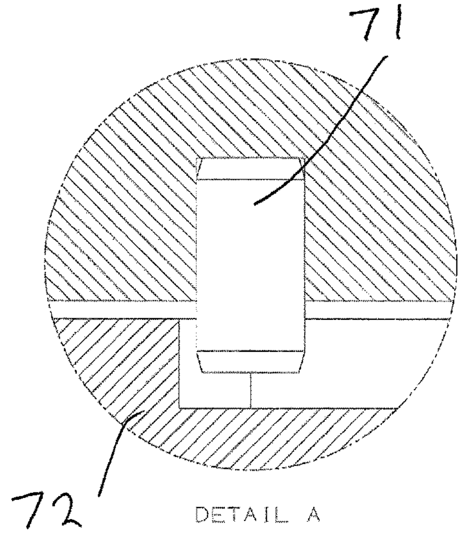

In at least one embodiment, the bracket 20 and carriage 50 of the guide arrangement 1 embodying the present invention are configured such that the carriage 50 is translatable with respect to the bracket 20 between a first position (shown in FIG. 1) and a second position (shown in FIG. 7). Complete detachment of the carriage 50 from the bracket 20 may be substantially prevented, by means of a mechanical stop 71 or other equivalent feature, as shown in FIG. 10*a*. The mechanical stop 71 constrains the translation of the carriage 50 with respect to the bracket 20 to within a predetermined range. At either extreme of movement, when the carriage 50 is fully received in the bracket 20, the mechanical stop 71 may abut against a step 72 on the base 22.

Figure 11:
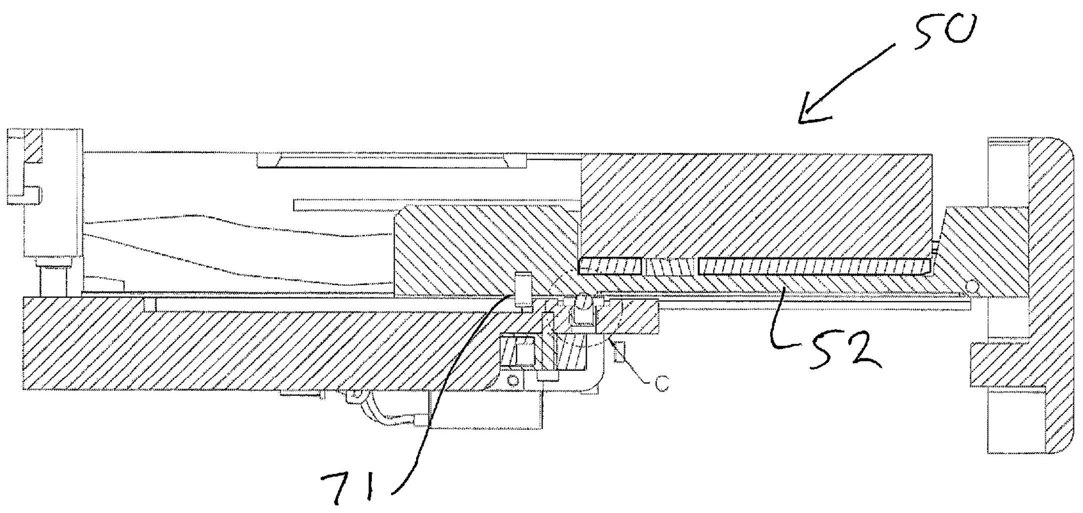
FIGS. 11 and 11*a* illustrate a tactile feedback arrangement of a guide arrangement embodying the present invention.
Figure 11A:
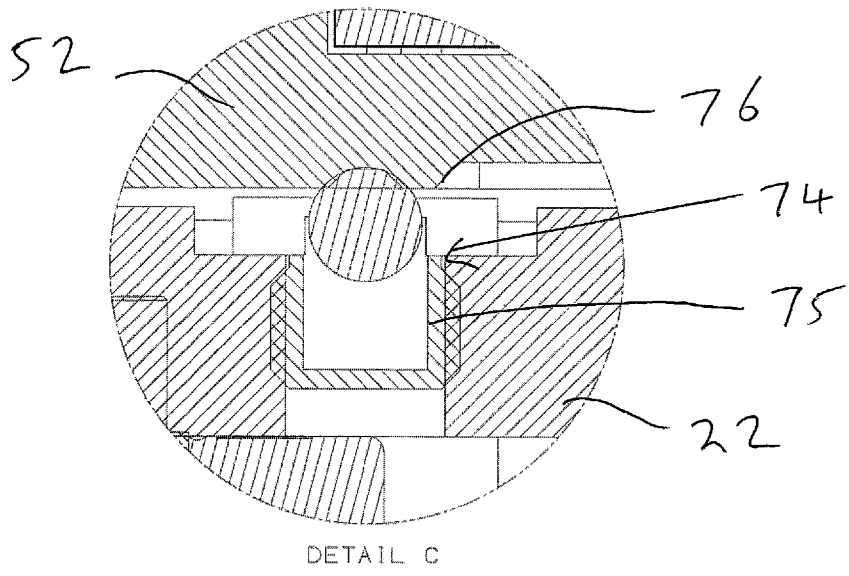

As shown in FIGS. 11 and 11*a*, there may further be provided a tactile feedback arrangement 74, comprising a ball plunger 75 which interacts with a protrusion 76. The ball plunger 75 is provided in the base 22, and the protrusion 76 is on the underside of the chassis 52 of the carriage 50. When the carriage 50 is translated to its first position, the ball plunger 75 may impact the protrusion 76, providing the user with tactile feedback to denote that the carriage 50 has reached the first position. The end of the chassis 52 may comprise another protrusion, to denote that the carriage 50 has reached the second position. The ball plunger 75 may ride in a groove during regular translation, before abutting the protrusion 76. The protrusion may comprises a dimple, into which the ball plunger 75 is receivable. The tactile feedback may be provided as the ball plunger descends into the dimple.

Figure 10B:
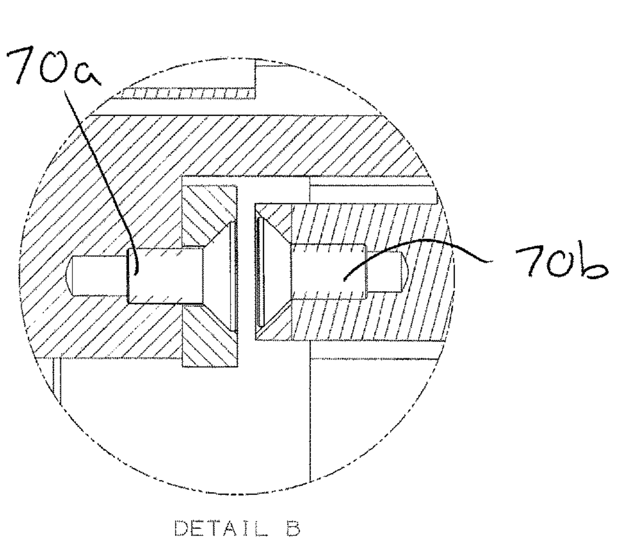

A magnetic member 70 may be provided on one of the end wall 55 and the end of the base 22, to retain the carriage 50 in the second position and to require manual force from the user, overcoming the magnetic force, to translate the carriage 50 from the second position back to the first position. In the embodiment shown in FIGS. 10, 10*a* and 10*b*, there are two magnetic members 70*a*, 70*b*. The first magnetic member 70*a* is connected to the end of the base 22, and the second magnetic member 70*b* is connected to the end wall 55.

The magnetic attraction force may also serve to overcome the spring force of the second sensor 65, described later.

When the carriage 50 is in the second position with respect to the bracket 20, the side walls 21*a*, 21*b* and base 22 serve to substantially protect the capillary holder 10, and the capillary 12, from interference and/or breakage.

The guide arrangement 1 is configured such that when the carriage 50 is in the first position with respect to the bracket 20, and the bed 51 is in the first position with respect to the carriage 50, a capillary holder 10 may be loaded onto the bed 51. Subsequently, when the bed 51 is arranged in the second position with respect to the carriage 50, and the carriage 50 is arranged in the second position relative to the bracket 20, the guide arrangement 1 may be said to be in a “loaded” configuration, in which the capillary 12 protruding from the capillary holder 10 is received in the port 102 of a source assembly 100.

In the embodiment shown, one end of the bed 51, opposite the end pivotably attached to the chassis 52, comprises at least one cam member 62 which has a cam surface and protrudes from the sides of the bed 51. With reference to FIG. 1, when the bed 51 is in the first position relative to the carriage 50, the cam members 62 may be configured such that translation of the carriage 50 with respect to the bracket 20 is substantially prevented, since the cam members 62 are arranged to impact the plates 24*a*, 24*b* arranged at the top of the side walls 21*a*, 21*b* of the bracket 20. The benefit of such an arrangement is that the carriage 50 may only be allowed to translate with respect to the bracket 20 if translation of the carriage 50 is attempted when a capillary holder 10 is in place on the bed 51.

In at least one embodiment, the guide arrangement 1 further comprises at least one lever 27, which may be associated with the bracket 20. In the embodiment shown, there are two levers 27*a*, 27*b* rotatably/pivotably mounted to the bracket 20. They may be pivotably mounted to the base 22 and/or the side walls 21*a*, 21*b* of the bracket 20. The cam member(s) 62 of the carriage 50 may be configured to engage with the levers 27*a*, 27*b* as the carriage 50 is translated with respect to the bracket 20, between the first and second positions. As the carriage 50 is translated from the first position to the second position, and if the bed 51 is in the second position with respect to the carriage 50, the cam members 62*a*, 62*b* engage with the underside of the levers 27*a*, 27*b*, causing the levers 27*a*, 27*b* to rotate. In so doing, the distal end of the levers 27*a*, 27*b* moves upwards with respect to the bracket 20.

The present invention further provides an assembly 200 for attachment to a housing 101 of a source assembly 100. The housing 101 has a port 102 to receive a capillary 12 into the source assembly 100 in use. The assembly 200 comprises the guide arrangement 1 as disclosed, wherein the bracket 20 is mountable to the housing 101 of the source assembly 100.

The assembly 200 further comprises a shutter 150 arrangeable adjacent to the port 102 of the source assembly 100, movable between an open position, to substantially expose the port 102 and allow the insertion of a capillary 12; and a closed position, to substantially cover the port 102 and prevent the insertion of a capillary 12 into the source housing.

In at least one embodiment, the guide arrangement 1 is configured to open the shutter 150 as the carriage 50 is translated with respect to the bracket 20, from the first position to the second position, towards the housing 101 of the source assembly 100. The movement of the carriage 50 with respect to the bracket 20 may be synchronised with the movement of the shutter 150.

In FIG. 1, the shutter 150 is shown configured in a closed position. A rear surface 151 of the shutter 150 comprises an aperture 152 which receives an end of the lever 27*a*, 27*b*. This is shown in FIG. 6. As the carriage 50 is translated with respect to the bracket 20, as shown in FIG. 7, the cams 62*a*, 62*b* on the carriage 50 cause the levers 27*a*, 27*b* to rotate, which causes the shutter 150 to move to an open position, as shown in FIG. 7. The lever 27*a*, 27*b* and/or cam members 62*a*, 62*b* are configured such that the shutter 150 is open by the time the capillary 12 protruding from the capillary holder 10 reaches the port 102.

In at least one embodiment, the guide arrangement 1 is configured such that if a capillary holder 10 is not mounted in the bed 51 of the carriage 50, and yet the carriage 50 is translated with respect to the bracket 20, as illustrated in FIG. 9, the shutter 150 is not caused to open. This is because, since the bed 51 is urged into the first position, the cam members 62*a*, 62*b* will not be caused to engage with the underside of the levers 27*a*, 27*b*. Instead, they will be arranged above the levers 27*a*, 27*b*, and not cause the levers 27*a*, 27*b* to rotate or the shutter 150 to translate upwardly into the open position. A benefit of this arrangement is that the shutter 150 will only be caused to open if a capillary holder 10 is arranged in the bed 51. Effectively, the capillary holder 10 acts as a "key" which must be in place in the bed 51 of the carriage 50 to allow the shutter 150 to open. This may prevent inadvertent contact of a user's fingers with high voltage connections inside the source housing 101, may prevent contamination of the source housing 101, may limit the undesirable escape of hot gas from the source housing 101, and may limit the potential for a user to be exposed to chemicals in the source housing 101.

The shutter 150 may be biased into the closed position, by gravity and/or an additional spring element.

In another embodiment, not shown, rather than urging the bed 51 into the first position relative to the carriage 50, the inner surfaces of the walls 21*a*, 21*b* may be provided with at least one track (e.g. one track per wall 21*a*, 21*b*). The end of the bed 51 opposite that which is pivotably attached to the chassis 52 may comprise at least one protrusion which is receivable in the corresponding track(s). The track(s) may be configured such that as a user begins to translate the carriage 50 into the bracket 20 and the protrusions ride along the track(s), the bed 51 is caused to rotate into the second position, ready for the bed 51 to translate into the enclosure 23 of the bracket 20.

When a capillary 12 needs to be removed from the source assembly 100, a user can translate the carriage 50 away from the bracket 20 and source assembly 100. As the carriage 50 translates away from the bracket 20, the distal end of the capillary 12 is then removed from the aperture 102 of the source assembly 100.

With the guide arrangement 1 as disclosed above and illustrated in the figures, when the carriage 50 reaches the extent of its translation with respect to the bracket 20 (back into the first position of the carriage 50 with respect to the bracket 20), the housing 11 of the capillary holder 10 is then clear of the enclosure 23 of the bracket 20. The housing 11 of the capillary holder 10 is also clear of the plates 24*a*, 24*b* protruding inwardly from the tops of the walls 21*a*, 21*b*. At this point, the capillary holder 10 may then be removed from the guide arrangement 1.

Depending on the spring force of any spring arranged between the chassis 52 and the bed 51, the bed 51 may, at this point, be urged upwardly into the first position, to allow a user to remove the capillary holder 10. However, as described above, in an embodiment including a pair of magnetically cooperating members, the bed 51, loaded with the capillary holder 10, may remain in the second position until a user removes the capillary holder 10 from the bed 51. As a user lifts the capillary holder 10 from the bed 51, and overcomes the magnetic force from the magnetically cooperating members, the spring force may then be enough to rotate the bed 51 into the first position. The guide arrangement 1 is then ready for a new capillary holder 10 (or the same capillary holder 10 with a new capillary 12 loaded therein) onto the bed 51.

In an alternative embodiment (not shown) where the inside surfaces of the walls 21*a*, 21*b* comprises at least one track, the translation of the carriage 50 away from the bracket 20 may, itself, cause the bed 51 to move back to the first position for the removal of the capillary holder 10.

The assembly may further comprise at least one sensor, to detect the relative position and/or status of various of the components.

In at least one embodiment, a first sensor 64 may be associated with the bed 51, to detect the existence of a capillary holder 10 on the bed 51. The output of the first sensor may be used to initiate at least one of the functions of the ion source 100 and/or associated detector (e.g. mass spectrometer). For example, when the first sensor 64 is triggered, the heater arrangement and gas source of the ion source may be activated. Accordingly, these functions of the ion source are initialised ready to receive the capillary 12 into the ion source 100. In at least one embodiment, there is provided an indicator light which signals to user when the ion source is ready to receive the capillary 12.

The cam member 62 may interact with the first sensor 64, or another sensor, when the bed 51 is in the first position relative to the carriage 50, and the carriage 50 is translated with respect to the bracket 20, The contact of the cam member 62 with the sensor 64 denotes that a capillary holder 10 is loaded on the bed 51. Conversely, if a capillary holder 10 is not loaded on the bed 51, the cam members 62 will not be positioned in a location that would cause contact with the sensor.

In at least one embodiment, a second sensor 65 may be associated with the carriage 50 and/or bracket 20, to detect when the carriage 50 has been translated with respect to the bracket 20. The second sensor 65 may be provided on the end of the base 22 distal from the shutter 150. The second sensor 65 may be configured so as to be contacted by the inside surface of the end wall 55 of the carriage 50. Activation of the second sensor 65 therefore denotes that the carriage 50 has been translated towards the bracket 20, which means that the capillary 12 should be received in the ion source housing 101. The activation of the second sensor 65 may cause further operations of the ion source to commence. For example, activation of the second sensor 65 may cause the detector to start data acquisition.

Conversely, when the carriage 50 is translated away from the bracket 20, as contact with the sensors is broken, the corresponding functions may also be stopped, providing a safety interlock. Alternatively, translation of the carriage 50 away from the bracket 20 (such that the second sensor 65 is broken) may not terminate the acquisition. A user may momentarily remove the capillary, add sample to the tip and reinsert it into the ion source housing 101.

The present invention further provides a method of loading a capillary into a source assembly, the capillary retained in the housing of a capillary holder and protruding therefrom, the method comprising:

- providing a guide arrangement comprising: a bracket; and a carriage translatably arranged with respect to the bracket, the carriage having a bed to receive the housing of the capillary holder;
- mounting the bracket on the housing of the source assembly;
- arranging the capillary holder on the bed of the carriage;
- translating the carriage with respect to the bracket towards the source assembly, such that the distal end of the capillary is received in the source assembly.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

Although certain example embodiments of the invention have been described, the scope of the appended claims is not intended to be limited solely to these embodiments. The claims are to be construed literally, purposively, and/or to encompass equivalents.

The invention claimed is:

1. A guide arrangement, suitable for use with a capillary holder of the type having a housing and a capillary protruding from the housing, the guide arrangement comprising:

a bracket; and a carriage translatably arranged with respect to the bracket, the carriage having a chassis and a bed, wherein the bed is pivotable with respect to the chassis and is configured to receive the housing of the capillary holder.

2. A guide arrangement according to claim 1, wherein the bed is pivotable with respect to the chassis between:

a first position, for receiving the housing of the capillary holder onto the bed; and a second position in which the capillary holder and carriage are translatable with respect to the bracket.

3. A guide arrangement according to claim 2, configured such that when the bed is in the first position relative to the chassis, translation of the carriage with respect to the bracket is substantially prevented.

4. A guide arrangement according to claim 2, wherein the bed is biased towards the first position.

5. A guide arrangement according to claim 2, configured such that, in the first position, the bed is arranged at an angle to the direction of translation of the carriage, and in the second position, the bed is arranged to be substantially parallel to the direction of translation of the carriage.

6. A guide arrangement according to claim 1, wherein the carriage comprises one of a pair of magnetically attractive members, for co-operation with the other of a pair of magnetically attractive members on the housing of the capillary holder, to retain the capillary holder on the bed in use.

7. A guide arrangement according to claim 1, wherein the bracket or carriage comprises at least one rail and the other of the bracket or carriage is slidably mounted to the at least one rail.

8. A guide arrangement according to claim 1, wherein the carriage has a capillary support channel, for receiving a capillary projecting from the housing of a capillary holder receivable on the bed in use.

9. A guide arrangement according to claim 8, wherein the carriage comprises a plinth arranged adjacent the bed, the plinth defining the capillary support channel.

10. A guide arrangement according to claim 1, wherein the bracket comprises opposing side walls and a base, defining an enclosure therebetween for receiving the carriage, and the carriage comprises an end wall configured to engage the side walls of the bracket when the carriage is translated with respect to the bracket.

11. An arrangement for attachment to a housing of a source assembly, the housing having a port for receiving a capillary into the source assembly in use, the arrangement comprising:

a guide arrangement according to claim 1, wherein the bracket is mountable to the housing of the source assembly; and a shutter arrangable adjacent the port, movable between an open position, to substantially expose the port, and a closed position, to substantially cover the port.

12. An arrangement according to claim 11, wherein the guide arrangement is configured to open the shutter as the carriage is translated with respect to the bracket, towards the housing of the source assembly.

13. An arrangement according to claim 12, wherein the guide arrangement is configured to open the shutter as the carriage is translated with respect to the bracket, towards the housing of the source assembly, only if a capillary holder is received on the bed of the carriage.

14. An arrangement according to claim 11, wherein the guide arrangement further comprises at least one lever, a first end of the lever being rotatably mounted to the bracket and the second end engagable with the shutter, and wherein the bed of the carriage comprises a cam member configured to engage with the lever as the carriage is translated with respect to the bracket, towards the housing of the source assembly, to open the shutter.

15. An arrangement according to claim 11, further comprising a capillary holder, wherein the capillary holder has a housing and a capillary protruding from the housing, the capillary holder being received on the bed of the carriage.

16. A guide arrangement according to claim 1, further comprising a capillary holder having a housing and a capillary protruding from the housing, the capillary holder received on the bed of the carriage.

17. A method of loading a capillary into a source assembly, the capillary retained in the housing of a capillary holder and protruding therefrom, the method comprising:

providing a guide arrangement comprising: a bracket; and a carriage translatably arranged with respect to the bracket, the carriage having a chassis and a bed to receive the housing of the capillary holder, and wherein the bed is pivotable with respect to the chassis;

mounting the bracket on the housing of the source assembly;

arranging the capillary holder on the bed of the carriage;

translating the carriage with respect to the bracket towards the source assembly, such that the distal end of the capillary is received in the source assembly.

18. A method according to claim 17, wherein the bed is pivotable with respect to the chassis between: a first position, for receiving the housing of the capillary holder onto the bed; and a second position in which the capillary holder and carriage are translatable with respect to the bracket, wherein the bed is arranged in the first position when arranging the capillary holder on the bed of the carriage, the method comprising moving the bed into the second position before the step of translating the carriage with respect to the bracket.

* * * * *